United States Patent [19]
Fichtner

[11] 3,908,959
[45] Sept. 30, 1975

[54] DEVICE FOR CONTROLLING FLUID FLOW
[75] Inventor: Hans E. Fichtner, Krefeld, Germany
[73] Assignee: Franz Klaus Union Armaturen Pumpen, Bochum, Germany
[22] Filed: Dec. 26, 1973
[21] Appl. No.: 427,163

[30] Foreign Application Priority Data
Dec. 22, 1972 Germany............................ 2263058

[52] U.S. Cl. .................. 251/133; 251/134; 251/65
[51] Int. Cl.² ................. F16K 31/10; F16K 31/06; F16K 31/04
[58] Field of Search...................... 251/65, 133, 134

[56] References Cited
UNITED STATES PATENTS

| | | | |
|---|---|---|---|
| 1,529,005 | 3/1925 | Beckwith | 251/134 X |
| 1,728,015 | 9/1929 | Spoehrer | 251/133 X |
| 2,289,574 | 7/1942 | Carlson | 251/65 |
| 2,442,599 | 6/1948 | Herrick, Jr. et al. | 251/65 X |
| 3,245,427 | 4/1966 | Porwit et al. | 251/134 X |
| 3,606,242 | 9/1971 | Lathrop | 251/65 X |
| 3,749,098 | 7/1973 | Bennetot | 251/65 X |
| 3,774,878 | 11/1973 | Martinez | 251/65 |

Primary Examiner—Arnold Rosenthal
Attorney, Agent, or Firm—Michael S. Striker

[57] ABSTRACT

A device for controlling fluid flow has a housing defining a chamber and a passage for the fluid flow. A valve member is mounted in the housing for displacement between an open position in which it is accommodated in the chamber and a closed position in which it extends into the passage so as to completely obstruct the flow of the fluid. The valve member is attached to a rod which is provided with an external thread engaging an internal thread of a sleeve which is driven in rotation about the rod by a gear transmission, whereby the rotation of the sleeve is transformed into longitudinal displacement of the rod. The gear is driven by a magnetically actuated rotor supported for rotation in a cylindrical receptacle dividing the chamber into two hermetically separated compartments. A magnetic unit surrounds the receptacle and produces a rotating magnetic field penetrating the receptacle and driving the rotor. A signal magnet shares the movement of the bar and indicates the position of the bar with respect to the housing. A signal indicative of the position of the signal magnet may be used for limiting the displacement of the rod, and thus of the valve member.

16 Claims, 5 Drawing Figures

DEVICE FOR CONTROLLING FLUID FLOW

BACKGROUND OF THE INVENTION

The present invention relates to a device for controlling fluid flow, and more particularly to a valve assembly in which the interior of the housing of the valve assembly is hermetically sealed with respect to the exterior thereof. Even more particularly, the present invention relates to an improved driving mechanism for displacing a valve member between valve-opening and valve-closing positions thereof.

There are already known various valve assemblies in which the housing is hermetically sealed. One of the oldest methods of hermetically sealing the valve assembly in which an actuating member, such as a rod, projects out of the housing of the valve assembly, is to provide a sealing element, such as a packing, a gasket or a sealing ring, about the rod in its portion which is accepted in the housing. However, this kind of a sealing element is disadvantageous since it affords only a limited amount of sealing and since it is subject to substantial wear. Thus, this kind of seal cannot be used in applications in which the medium is to be absolutely prevented from escaping into the space surrounding the valve assembly. Examples of such media are poisonous or chemically active substances, combustible gases or liquids and similar substances.

It has already been attempted to avoid the disadvantages of the prior art sealing arrangements, particularly their low sealing capacity, by providing a sealing member between two mutually displaceable parts of the valve assembly, such as between the actuating rod and the housing thereof, which sealing member has elastic properties. In view of the fact that the actuating member may be displaceable only in its longitudinal direction, may only be subjected to rotation about its axis, or may conduct a movement which is a combination of longitudinal and circumferential movements, the sealing member must be capable of withstanding considerable stress. In order to reduce the stress, the sealing member may be made of elastic material which is folded in an accordion-like fashion. However, experience has shown that the life span of such sealing members, even if folded, is relatively short due to the repeated stressing thereof during each valve-actuation operation. This is true even if the sealing member is made of a material having high flexibility. Furthermore, since the actuating member may travel a considerable distance as the valve member is displaced between its fully closed and fully open position, the manufacture of such sealing elements is difficult. This is particularly true for gate valves, in which the travelling distance of the actuating member amounts to all or a large portion of the inner diameter of the pipe in which this valve is used. Of course, the sealing member must have such dimensions as to permit this displacement; consequently, the sealing member is rather bulky. Moreover, since the sealing member is superimposed on the housing of the gate valve which already has a chamber of such dimensions as to be capable of accommodating the valve member when in its open position, the ensuing construction places high demands on available space, so that this valve arrangement cannot be used in applications where the amount of available space is limited.

It is also already known in pumping devices to provide a compartmentalizing receptacle which divides the chamber of the pump into two compartments, the pump turbine or rotor sharing a movement of a shaft which is, in turn, connected to the rotor of the electromotor supported in the compartmentalizing receptacle. In this case, there is no need for providing sealing between the rotor of the pump and rotor of the electromotor, since the stator of the electromotor is separated from the rotor thereof by the compartmentalizing receptacle, so that the liquid being pumped is prevented from entering the compartment in which the stator is located and damaging the same. However, this arrangement is a rotary drive which is not suitable for use in valve assemblies in which the extent of movement of the driven member, such as a valve member, even though possible considerable, is nevertheless limited.

SUMMARY OF THE INVENTION

Accordingly, it is an object of the present invention to provide a fluid flow control device which is not possessed of the disadvantages of the prior art devices.

More particularly, it is an object of the present invention to provide a drive for actuating a valve member.

It is an additional object of the present invention to provide a compact valve assembly for use in controlling the flow of fluid, which effectively prevents the fluid from escaping to the exterior of the valve assembly.

It is a further object of the present invention to provide a valve assembly which has a high degree of reliability even after an extended period of operation.

It is a concomitant object of the present invention to provide a valve assembly which can be actuated either manually or mechanically.

In accordance with these objects and others which will become apparent hereinafter, one feature of the invention resides in providing a valve assembly having a housing defining a passage and an internal chamber with a compartmentalizing receptacle dividing the chamber into two compartments. A valve body, such as a gate valve member, is displaceably mounted in the housing between an open position in which it is accepted in the first one of the compartments and a closing position in which it extends into the passage to prevent flow of fluid therethrough. A rotating magnetic field generated either by permanent magnets mounted in the second one of the compartments for rotation about the compartmentalizing wall or by an electrically activated stator located in the second compartment, penetrates the compartmentalizing receptacle and exerts a magnetic force on a rotor supported for rotation is the compartmentalizing receptacle. The compartmentalizing receptacle hermetically seals the first one from the second one of the compartments, so that the fluid which may enter the first compartment is prevented from entering the second compartment. A transmission converts the rotation of the rotor into a displacement of the valve body.

As a result of the above-discussed arrangement according to the invention, a sealing arrangement is obtained which is not subjected to any stresses during the operation of the device, so that the necessary hermetic closure of the first compartment is assured even after an extended period of use of this valve arrangement. As a result of the presence of the intermediate transmission, there is obtained a possibility to transform the rotational movement of the rotor into any other desired movement. Consequently, the rotor may be located spaced from the actual actuating rod or similar member for displacing the valve member in any structurally or spatially advantageous manner, so that it can, for instance, be achieved that the driving arrangement for driving the actuating rod does not project excessively beyond the circumferential surface of the pipe in, for instance, upward direction. In addition thereto, since the transmission can be of any desired construction, it is possible to use the driving arrangement universally.

In a currently preferred embodiment of the invention, there is provided a driving rotor is the second compartment and a driven rotor in the first compartment of the chamber, and each of the rotors is provided with a plurality of permanent magnets. If this embodiment is used, the arrangement is particularly simple and no electric current is to be delivered into the interior of the housing. The driving rotor may be actuated either manually and/or by means of an auxiliary driving motor located outside the housing of the valve arrangement.

According to a currently preferred embodiment of the invention which is to be used in case that the driven element, such as a gate valve member, is to be displaced in the longitudinal direction thereof, the rotor rotates about as axis which is offset with respect to the axis of the path along which the driven element is displaced. It is to be understood that not only may the axis of the rotor extend in parallelism with the axis of the path, but it may enclose any arbitrary angle therewith as may be desired, in which case the transmission includes bevel gears or worm gears instead of the spur gears which may be used when the axes extend parallel to one another. It may be seen that this arrangement has a high degree of verstility, so that the housing accommodating the transmission may have any desired shape depending on the space and accessibility requirements.

The transmission, as already mentioned, may preferably be a gear transmission including a pinion and a spur gear forming a reduction gear. This arrangement is particularly advantageous since it renders possible an increase in the force being applied to the driven element with simultaneous reduction of the speed of its displacement. This is of particular importance if the valve assembly is used not only for fully closing and opening the passage for flow of the fluid through the assembly, but also for regulating the quantity of the fluid passing therethrough.

Experience has further shown that it is particularly advantageous if the transmission comprises, in addition to the gear wheel, a disk member supported for rotation about an axis coinciding with the axis of the spur gear. Entrainment members are provided on each of the gear and the disk and cooperate with one another so as to cause the disk to share the rotational movement of the gear wheel in both directions of rotation. Advantageously, one entrainment member of the disk cooperates with the entrainment member of the gear wheel for one direction of rotation, while another entrainment member of the disk cooperates with the entrainment member of the gear wheel for the opposite direction of rotation. The two entrainment members of the disk may be spaced a different distance from the axis of rotation, while a single entrainment member is provided on the gear wheel cooperating with the respective one of the two entrainment members of the disk.

According to a further advantageous embodiment of the invention, a signal magnet is provided in the interior of the housing, sharing the displacement of the driven element. A switching unit is provided exteriorly of the housing and cooperates with the signal magnet so that the magnetic field penetrating the walls of the housing influences the switching unit. By this means, it is achieved that the driven member may be displaced in an exactly predetermined position.

In the latter embodiment, the switching unit may be a holding magnet which limits the range in which the driven member is permitted to move along its path, thus determining the degree of opening of the passage. In addition hereto, the holding magnet may be arranged so as to be displaceable with respect to the housing in a parallel direction to the displacement of the driven member; if such is the case, the range of displacement of the driven member may be adjusted by adjusting the position of the holding magnet. Advantageously, the position of the holding magnet with respect to the housing may be adjusted by means of an auxiliary adjustment motor; in this event, the position of the driven member with respect to the housing and thus the degree of opening of the passage for the flow of fluid is easily adjusted, possibly also by remote control.

Alternatively, instead of providing a switching unit or a holding magnet, a tracing magnet may be provided exteriorly of the housing, which magnet traces the movement of the signal magnet located in the interior of the housing. The tracing magnet may be connected to a wiper which is displaced along a potentiometer, thus changing the resistance thereof. In this manner, the instantaneous position of the signal magnet and thus of the driven member may be easily established by measuring the current flowing through the potentiometer or voltage at the wiper. Also, the current or voltage drop at the potentiometer may be used for switching the driving motor on or off, possibly also be remote control.

Furthermore, if the driving motor is an electromotor, particularly a shifting armature motor, it is possible to use the magnetic field generated by the signal magnet for direct magnetic or inductive turning of the electromotor on or off. In this case, a direct feedback between the driven member and the driving motor is established.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
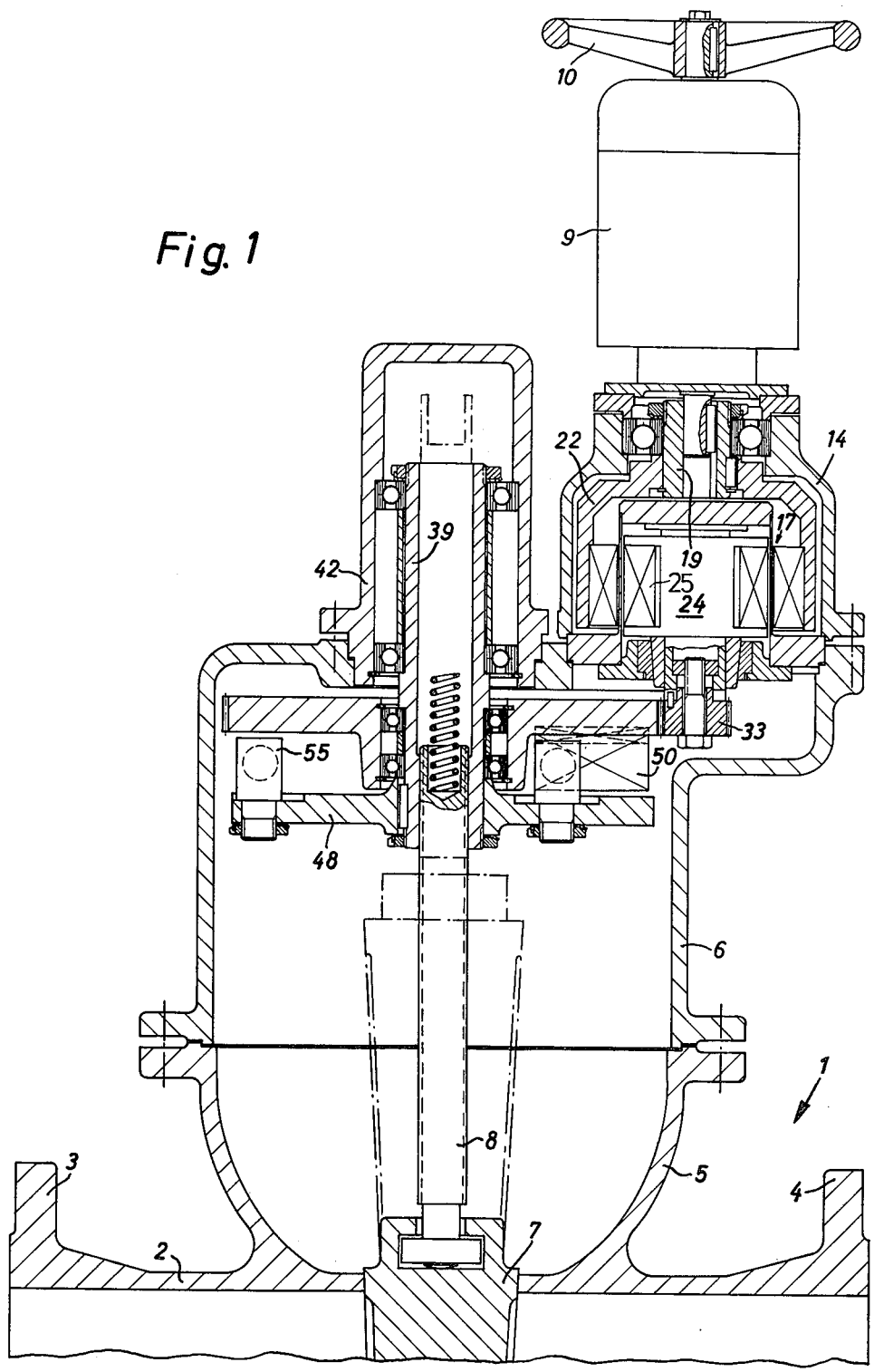
FIG. 1 is a vertical section of a gate valve assembly utilizing a driving arrangement according to the invention.
Figure 2:
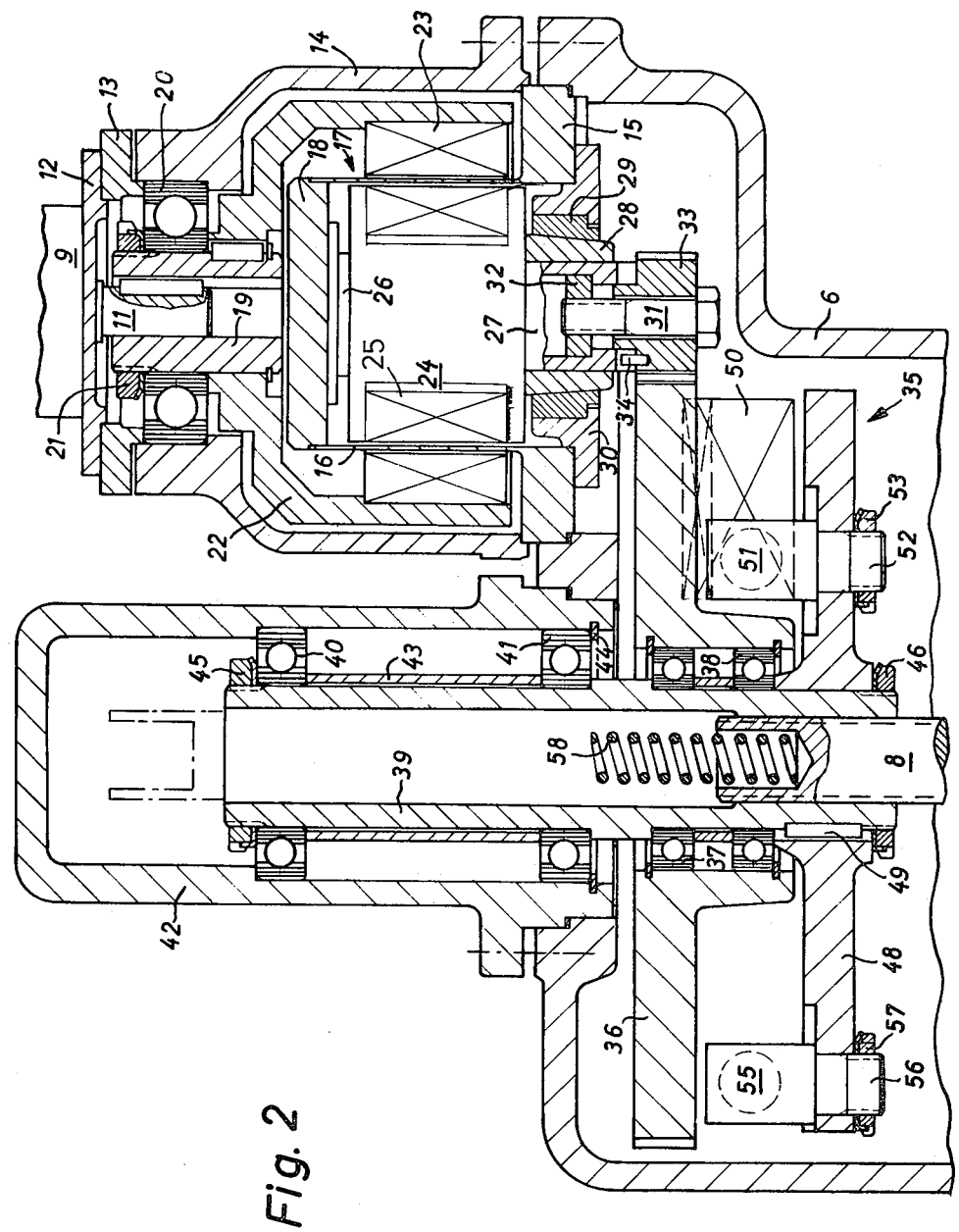
FIG. 2 is a portion of the gate valve assembly illustrated in FIG. 1, on a larger scale.

Referring to the drawings, and first to the FIGS. 1 and 2 thereof, it may be seen therein that a gate valve assembly 1 has a housing 2 provided with flanges 3 and 4 which serve for connecting the housing 2 to a pipe system. The housing 2 is further provided with a portion 5 which diverges in the upward direction as seen in the drawings and which is sealingly connected to a housing portion 6. The portions 5 and 6 together define a chamber in the housing 2, while the portion 5 defines a passage for the flow of fluid therethrough. A gate valve 7 is provided in the housing 2 and is illustrated in its closed position in which it projects into the passage in the portion 5, fully obstructing the flow of fluid therethrough. The gate valve 7 is displaceable from the illustrated closed position into a fully open position in which it fully opens the flow of fluid through the passage by being accommodated in the chamber defined by the portions 5 and 6 of the housing. An actuating rod 8 which is displaceable in the axial direction thereof but which is prevented from rotating about its axis is connected to the gate valve 7 in a conventional manner. The actuating rod 8 is provided with an external thread.

An electromotor 9 is provided externally of the housing 2 and serves the purpose of driving the actuating rod 8 in a manner which will be described later on. A hand wheel 10 or a similar manual actuating member may be attached to the shaft of the electromotor 9 so that the actuating rod 8 may be driven either manually or electromechanically. It is to be noted in this respect that any other motor of conventional construction may be substituted for the electromotor 9 if so desired.

Coming now to FIG. 2 which shows in greater detail some of the elements shown in FIG. 1, it may be seen therein that a shaft 11 of the motor 9 enters the interior of the valve housing 2 through a closing plate 12 which, in turn, is attached to a cup-shaped housing portion 14, a ring 13 being interposed between the plate 12 and the housing portion 14. The latter is attached to the housing portion 6, a ring 15 being interposed therebetween. The ring 15 is inserted into a circular recess provided in the housing portion 6 and a relatively thin compartmentalizing wall 16 is attached to the ring 15. A lid plate 18 is sealingly connected to the compartmentalizing wall 16; the ring 15, the compartmentalizing wall 16 and the lid plate 16 together form a compartmentalizing receptacle 17 which divides the chamber of the housing 2 into two compartments which are hermetically sealed with respect to one another, owing to the presence of the receptacle 17 therebetween.

A sleeve 19 is fastened to the shaft 11 of the electromotor 9, for instance, by wedging, so as to share the rotational movement thereof. The sleeve 19 is supported in the housing portion 14 for rotation about the axis thereof by means of a ball bearing 20 which is attached to the sleeve 19 by a secured nut 21. The outer race of the ball bearing 20 is accepted into a cylindrical bore provided in the housing portion 14 and is secured therein by the ring 13. A cup-shaped rotor 22 is secured to the sleeve 19 so as to share its rotational movement, being prevented from conducting axial movements relative to the sleeve 19 by a resilient ring. The cup-shaped rotor 22 surrounds the receptacle 17 and is surrounded by the housing portion 14 with sufficient clearance to permit rotation of the rotor 22 with respect to the stationary housing portion 14 and receptacle 17. The rotor 22 is provided on its side facing toward the receptacle 17 with permanent magnets 23 which, when the rotor 22 is caused to rotate, move along the compartmentalizing wall 16 of the receptacle 17.

A rotor 24 is supported in the compartmentalizing receptacle 17 for rotation relatively thereto, and is provided with permanent magnets 25 on its circumferential wall facing the compartmentalizing wall 16 of the receptacle 17. The magnetic field genrated by the permanent magnets 23 penetrates the compartmentalizing wall 16 and acts upon the permanent magnets 25 of the rotor 24 and thus on the rotor 24 itself, forming a driving coupling between the rotor 22 and the rotor 24. The rotor 24 is supported in a downwardly projecting portion 26 of the lid plate 18 and is provided with a central shaft 27 which projects downwardly of the rotor 24. A barrel ring 28 is attached to the shaft 27 and is provided with a conical surface which engages a complementary surface of a bearing ring 29. The latter is supported in the housing 2 by being attached to an intermediate ring 30 which, in turn, is attached to the ring 15.

A screw 31 and a nut 32 are used for attaching a pinion 33 to the shaft 27, the pinion 33 being provided with a securing pin 34 assuring transmission of the rotary movement of the shaft 27 to the pinion 33. The pinion 33 is a part of a transmission 35 between the shaft 27 of the rotor 24 and the driven actuating rod 8. The transmission 35 further comprises a gear wheel 36 meshing with the pinion 33. The gear wheel 36 is supported on a sleeve 39 by two ball bearings 37 and 38. The sleeve 39 is supported in the housing 2, more particularly in a downwardly open portion 42 thereof, by ball bearings 40 and 41. The housing portion 42 is attached to the housing portion 6, being attached thereto by bolts only the axes of which are shown. The ball bearings 37 and 38 are attached to the sleeve 39 and the gear wheel 36 in a conventional manner which is shown in the drawings, while the ball bearings 41 and 42 are accommodated in the housing portion 42 and on the sleeve 39 also in a conventional manner by means of a distance sleeve 43, a ring 44 and a secured nut 45 threaded on an external thread of the sleeve 39 and secured in its position.

The other end— in the drawing the lower one — of the sleeve 39 is also provided with an external thread, and a secured nut 46 is threaded on this other end and secured in its position. A hub of a disk 48 is supported on the sleeve 39 and secured thereto so as to share the rotatioanl movement thereof, by means of a key or wedge 49. The nut 46 engages the hub of the disk 48 which, in turn, engages the inner race of the ball bearing 38, so that the disk 48 and the bearings 37 and 38 are prevented from conducting movement axially of the sleeve 39, since the inner race of the bearing 37 abuts against a shoulder provided on the sleeve 39.

An entrainment member 50 is attached to the gear wheel 36, for instance, by being press-fitted into a recess thereof. The entrainment member 50 may be a rectangular plate. An entrainment member 51 is provided with a threaded portion 52 which extends through a hole in the disk 48, and a secured nut 53 is used for attaching the entrainment member 51 to the disk 48. Similarly, an entrainment member 55 is attached to the disk 48 by a secured nut 57 which is threaded on a threaded portion 56 of the entrainment member 55. The entrainment members 51 and 55 cooperate with the entrainment member 50, each of the entrainment members 51 and 55 being associated with one direction of rotation of the gear wheel 36. So, for instance, if the gear wheel rotates in the clockwise direction as seen from above in FIG. 2, then the entrainment member 50 of the gear wheel 36 cooperates with the entrainment member 51 of the disk 48, while for the counterclockwise direction, the entrainment member 50 cooperates with the entrainment member 55 of the disk 48. The entrainment member 55 is arranged diametrically opposite the entrainment member 51, and at a larger distance from the axis of rotation of the disk 48 than the latter. For instance, the cooperation of the entrainment members 50 and 51 may be associated with the closing movement of the gate valve 7, while the cooperation of the entrainment members 50 and 55 may be associated with the opening movement thereof.

The sleeve 39, or the lower portion thereof, is provided with an internal thread, and the external thread of the actuating rod 8 engages the internal thread of the sleeve 39. In this manner, the rotational movement of the sleeve 39 is transformed into an axial displacement of the actuating rod 8. It is to be understood that the housing portion 42 has a sufficient height so that the actuating rod 8 may be fully accepted therein without abutting against it when displaced into its uppermost position, that is into the position corresponding to the fully open position of the gate valve 7. In order to dampen the movement of the actuating rod prior to its reaching its uppermost position, a helical spring 58 is carried by the actuating rod 8 which abuts against the upper wall of the portion 42 and counteracts the force exerted on the actuating rod by the sleeve 39.

The device operates as follows:

Starting from the illustrated position of the gate valve 7 in which the flow of fluid through the passage in the housing 2 is fully obstructed, that is from the situation in which the actuating rod 8 is in its lowest position, it may be seen that when the shaft 11 is rotated either manually by the hand wheel 10 or by energizing the electromotor 9, the cup-shaped rotor 22 with the attached magnets 23 shares the rotary movement of the shaft 11 and the magnetic field generated by the magnets 23 rotates with respect to the compartmentalizing receptacle 17 and penetrates the same. The receptacle 17, while being pervious to the magnetic field, is non-permeable to fluid, so that the compartment of the chamber in the housing 2 which accommodates the rotor 22 is hermetically separated from the other compartment accommodating the other components of the valve assembly, the latter assembly thus being hermetically sealed with respect to the exterior of the housing. The magnetic field generated by the magnets 23 drives the rotor 24 accommodated in the receptacle 17 due to the presence of the magnets 25 on the rotor 24. The shaft 27 transmits the rotary movement of the rotor 24 to the pinion 33 which meshes with the gear wheel 36, causing a rotary movement thereof. The entrainment member 50 abuts against the entrainment member 51 of the disk 48, setting the latter into rotation which is shared by the sleeve 39. As the sleeve 39 rotates, the actuating member 8 is displaced upwardly until the helical spring 58 abuts against the upper wall of the housing portion 42, at which time the spring force counteracts the force transmitted from the driving means 9 or 10, damping the movement of the actuating rod 8 until the latter is brought to a stop. When the gate valve 7 is to be closed, the above-described operation is repeated, this time with reversed sense of rotation of the driving means 9 or 10; the only difference is that this time the entrainment member 50 of the gear wheel 36 cooperates with the entrainment member 55 of the disk 48 and, of course, that the actuting rod 8 moves downwardly, displacing the gate valve 7 into its closed position.

Figure 3:
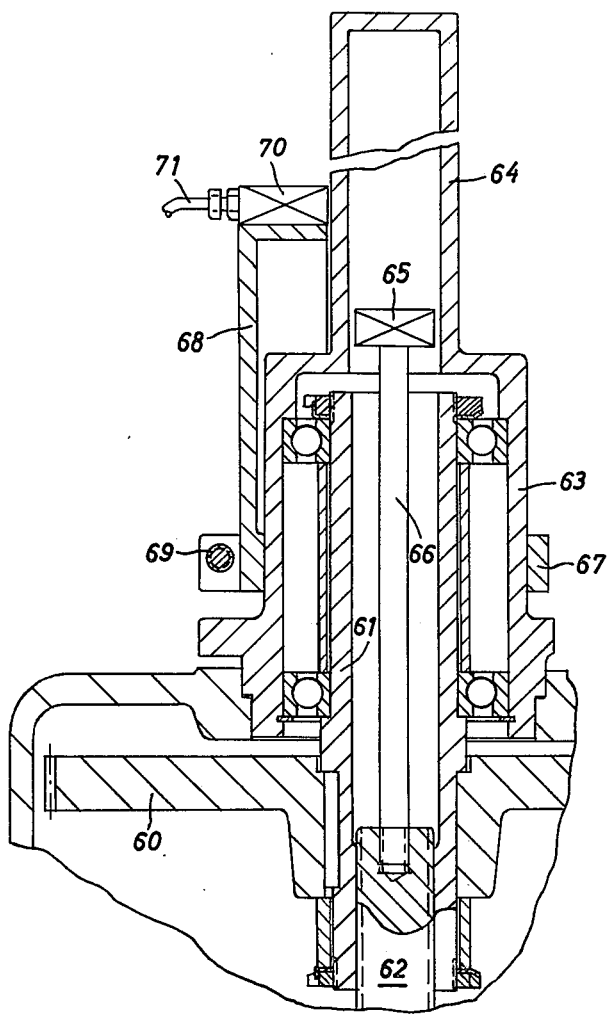
FIG. 3 is a vertical section through a modified portion of the gate assembly illustrated in FIG. 1, showing a first embodiment of the arrangement for determining the position of the gate valve.

FIG. 3 shows a somewhat modified embodiment of the gate valve assembly and the driving means therefor according to the invention. Instead of providing the gear wheel 36, the disk 48 and the associated entrainment members 50, 51 and 55, only a single gear wheel 60 is provided which is directly connected to the sleeve 61 (corresponding to sleeve 39 of the previous embodiment). Here again, an actuating rod 62 is provided (corresponding to 8) which comprises an external thread engaging the internal thread of the sleeve 61. A modified housing portion 63 replaces the housing portion 42 of FIGS. 1 and 2, which is provided with a central projection 64 having a smaller diameter than the remainder of the portion 63. A signal magnet 65 is accommodated in the central projection 64 so as to be displaceable in the axial direction thereof, and is connected to the actuating rod 62 by means of a connecting rod 66. Thus, the displacement of the actuating rod 62 results in a commensurate displacement of the signal magnet 65 which so indicates the position of the actuating rod 62 within its displacement range and, consequently, the position of the gate valve 7 with respect to the passage in the housing 2. A fastening ring 67 having an upwardly projecting portion 68 is clamped to the outer circumference of the housing portion 63 by means of a tightening element 69 so as to be displaceable with respect to the housing portion 63 and arrestable in any selected position. A switching unit 70 is attached to the projecting portion 68 of the ring 67 and may be actuated by the magnetic field generated by the signal magnet 65 when the same arrives at the same elevation at which the signal unit is arrested. An electrically conductive element 71 connects the switching unit with the electric circuitry of the driving motor 9, and the switching signal generated by the switching unit is delivered to the electomotor 9 in order to shut the same off. Alternatively, the switching unit may be a holding magnet which arrests the signal magnet 65 when the latter arrives at the elevation corresponding to the elevation of the switching unit, so that the further upward movement of the actuating rod 62 is prevented, particularly if caused by actuating the hand wheel 10.

Figure 4:
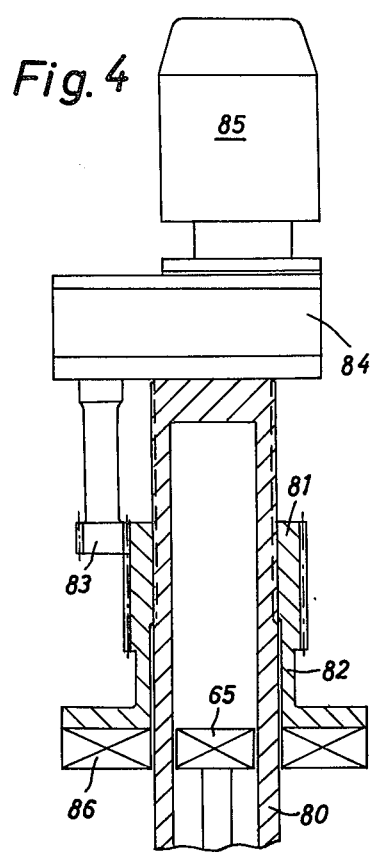
FIG. 4 is a section similar to FIG. 3 and showing a second embodiment of the arrangement for determining the position of the gate valve.

FIG. 4 shows a modified embodiment of the invention according to FIG. 3 in which the signal magnet 65 slides in a projection 80 whose upper end is provided with an external thread. A traveling sleeve 82 is provided in its upper portion 81 with an internal thread which engages the external thread of the projection 80. The upper portion 81 is further provided with external teeth, and a pinion 83 meshes with these teeth so as to bring the traveling sleeve 82 into rotation. A transmission 84 is provided which transforms the rotation of an adjusting motor 85 into a rotation of the pinion 83. The traveling sleeve 82 is further provided on its lower portion with a system of magnets 86 which share the movement of the traveling sleeve 82. When the adjustment motor 85 is energized so as to rotate in one or the other direction, the ensuing rotation of the pinion 83 results in rotation of the traveling sleeve 82 and in axial displacement thereof. In this manner, the position of the magnets 86 with respect to the projection 80 can be easily adjusted, possibly also by remote control, and thus the extent of movement of the actuating rod 62 and the valve 7 sharing its movement can be limited, for instance, for the purpose of controlling the amount of fluid passing through the passage of the housing 2.

Figure 5:
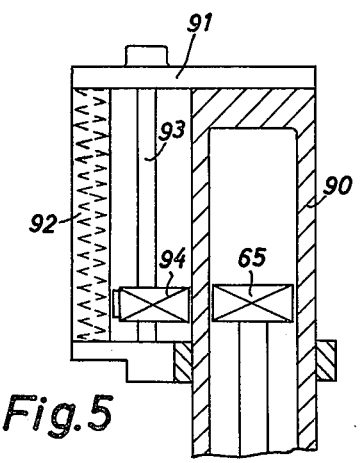
FIG. 5 is a section similar to FIG. 3 and showing a third embodiment of the arrangement for determining the position of the gate valve.

In the modified embodiment as illustrated in FIG. 5, the signal magnet 65 is displaceably accommodated in a projection 90. A carrier 91 is attached to the projection 90 extending transversely thereof, and a potentiometer 92 is carried by the carrier 90 and extends in axial parallelism to the projection 90. A tracing magnet 93 is supported by and displaceable along a rod 93 and traces the movement of the signal magnet 94, being provided with a projection serving as a wiper for the potentiometer 92. The construction and operation of such potentiometer and associated wiper are so well known as not to necessitate further elaboration. It is only to be understood that the position of the wiper with respect to the potentiometer is indicative of the position of the signal magnet 65 and thus of the gate valve 7. The signal generated or modified by the potentiometer may be used as an indication and/or as a control signal controlling the operation of the motor 9 so as to regulate the quantity of the fluid flow through the passage of the housing 2.

It is to be noted that in the currently preferred embodiments of the invention which have been discussed above, there is provided a hermetically sealing separation between the two compartments of the chamber defined by the housing 2, so that the fluid which may freely enter the compartment in which the gate valve 7 is accepted following its movement from its fully closed position into a partially or fully open position, is prevented from escaping to the outside of the housing 2. This advantageous effect is predominantly caused by the absence of any sealing elements which would otherwise have to seal a gap between two relatively moving elements, such as a shaft with respect to a housing. Of course, there are provided other sealing elements between the various portions of the housing, but all of these elements seal gaps between portions which are stationary with respect to one another, so that the danger of the fluid passing through the passage is significantly reduced if not eliminated. Consequently, this valve arrangement may be used for fluids which pass through the passage at significantly elevated pressure and/or temperature. For instance, experience has shown that the valve assembly may be used for controlling the flow of fluids whose temeprature is as high as 400°C due to the fact that the magnetic driving means (rotors 22 and 24) are insensitive to the variations in temperature and afford driving force even at this elevated temperature.

While this invention has been discussed as embodied in a gate valve assembly, it is evident that the basic principle thereof may be used in valves of any kind.

Furthermore, it is to be understood that instead of providing the rotor 22, a stator armature with associated windings may be provided, in which case the motor 9 and the handwheel 10 are dispensed with an the rotating magnetic field is generated by energizing the windings. Moreover, other kinds of bearings may be used instead of the ball bearings 37, 38, 40 and 41 which, depending on the intended use of the valve assembly, may be made of corrosion and/or temperature resistant materials such as graphite, ceramic material or polytetrafluoroethylene.

It will be understood that each of the elements described above, or two or more together, may also find a useful application in other types of constructions differing from the types described above.

While the invention has been illustrated and described as embodied in gate valve assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a device for controlling fluid flow, a combination comprising a housing defining a passage for the flow of fluid between an inlet and an outlet and an internal chamber; fluid flow control means including at least one valve seat provided in said passage intermediate said inlet and said outlet and a valve body having at least one sealing surfac and mounted in said housing for displacement in a path between an open position and a closing position in which said sealing surface engages said valve seat for obstructing the flow of fluid through said passage; compartmentalizing means dividing said chamber into a first and a second compartment which are hermetically sealed with respect to one another and including a receptacle offset from said path; first drive means for effecting the displacement of said valve body along said path and located in said first compartment, said first drive means including a magnetic member mounted in said receptacle for displacement with respect thereto offset from said path; and second drive means for actuating said first drive means and located in said second compartment, said second drive means including magnetic means located adjacent said receptacle and operative for generating a magnetic field penetrating said receptacle and acting on said magnetic member so as to displace the same.

2. A combination as defined in claim 1, wherein said magnetic member includes at least one permanent magnet.

3. A combination as defined in claim 1, wherein said magnetic means includes a stationary armature having a plurality of poles, and a plurality of windings mounted on said poles and energized by electric current so as to generate the magnetic field.

4. A combination as defined in claim 1, wherein said magnetic means includes at least one permanent magnet mounted for displacement with respect to said compartmentalizing means.

5. A combinatiion as defined in claim 1, wherein said receptacle is cylindrical; wherein said magnetic member is a rotor mounted for rotation in said cylindrical receptacle; and wherein said magnetic means is an additional rotor mounted in said housing for rotation and surrounding said cylindrical receptacle.

6. A combination as defined in claim 1, and further comprising a signal magnet accommodated in said first compartment and operatively associated with said valve body so as to share the displacement thereof between said open and closing positions thereof, and a switching unit located exteriorly of said housing and energizable in response to the displacement of siad signal magnet.

7. A combination as defined in claim 6, wherein said switching unit is a tracing magnet supported on said housing for displacement with respect thereto in response to displacement of said signal magnet; and further comprising a potentiometer having a wiper attached to said switching unit to share its movement, said potentiometer controlling the operation of said first and second drive means.

8. A combination as defined in claim 6, and further comprising an electromotor driving said second drive means; and means for starting and discontinuing the operation of said electromotor by inductively influencing the same by said signal magnet.

9. A combination as defined in claim 6, wherein said switching unit includes a holding magnet magnetically acting on said signal magnet for limiting the extent of displacement of the latter and thus of said valve body.

10. A combination as defined in claim 6, further comprising means for mounting said switching unit on said housing for displacement with respect thereto in the direction of displacement of said signal magnet; and means for arresting said switching unit in a selected position with respect to said housing.

11. A combination as defined in claim 10, and further comprising an adjustment motor operatively associated with said switching unit for displacing the same into said selected position.

12. In a device for controlling fluid flow, a combination comprising a housing defining a passage for the flow of fluid between an inlet and an outlet thereof, and an internal chamber; fluid flow control means including at least one valve seat provided in said passage intermediate said inlet and said outlet and a valve body having at least one sealing surface and mounted in said housing for displacement along a path having an axis, between an open position and a closing position in which said sealing surface engages said valve seat for obstructing the flow of fluid through said passage; compartmentalizing means dividing said chamber into a first and a second compartment which are hermetically sealed with respect to one another and including a cylindrical receptacle; first drive means for effecting the displacement of said valve body between said open and said closing position and located in said first compartment, said first drive means including first magnetic means located adjacent said compartmentalizing means and including a rotor mounted in said cylindrical receptacle for rotation about an axis which is offset with respect to said axis of said path; and second drive means for actuating said first drive means and located in said second compartment, said second drive means including second magnetic means situated adjacent said compartmentalizing means and including an additional rotor mounted in said housing for rotation about said cylindrical receptacle and surrounding the same and generating a magnetic field penetrating the latter and acting on said first magnetic means.

13. A combination as defined in claim 12, wherein said first drive means further comprises a reduction gear.

14. A combination as defined in claim 12, wherein said reduction gear comprises a pinion sharing the rotation of said rotor about its axis and a gear wheel mounted for rotation about said axis of said path and meshing with said pinion; and further comprising a disk supported for rotation about said axis of said path, a first and a second connecting member attached to said disk, and an abutment portion on said gear wheel abutting against said first connecting member when said gear wheel rotates in one direction and against said second connecting member when said gear wheel rotates in said second direction whereby said disk shares the rotational movement of said gear wheel.

15. A combination as defined in claim 14, wherein said first connecting member is spaced a larger distance from said axis of said path than said second connecting member.

16. A combination as defined in claim 14, wherein said first drive means further comprises a sleeve connected to said disk so as to share the rotational movement thereof and provided with an internal thread, and an elongated axially displaceable rod member extending coaxially to said path and provided with an external thread engaging said internal thread of said sleeve whereby the rotational movement of said sleeve is transformed into a longitudinal movement of said rod member.

* * * * *